Figure 1:
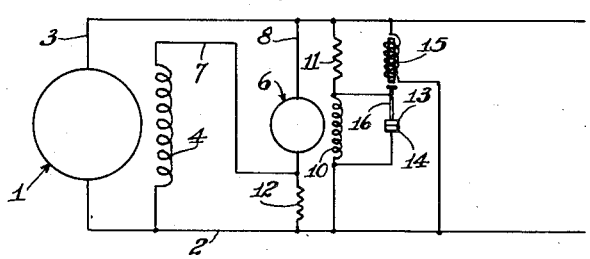

Oct. 26, 1943.   E. I. SHOBERT, 2D   2,332,942
GENERATOR REGULATOR
Filed May 8, 1942

WITNESSES.
A.B.Wallace.
V.A.Peckham.

INVENTOR.
Erle I. Shobert II
BY Brown, Critchlow & Flick
his ATTORNEYS.

Patented Oct. 26, 1943

2,332,942

UNITED STATES PATENT OFFICE 2,332,942

GENERATOR REGULATOR

Erle I. Shobert, II, St. Marys, Pa., assignor to Stackpole Carbon Company, St. Marys, Pa., a corporation of Pennsylvania Application May 8, 1942, Serial No. 442,160

5 Claims. (Cl. 171—225)

This invention relates to apparatus for automatically regulating the output of electric generators, by which is meant either their voltage output or their current output, or both.

One of the main problems confronting the manufacturers of aviation electrical equipment is that of finding a regulator which will satisfactorily control the high field currents and high ratings of the 28-volt aviation generators that are standard equipment. At present, the ratings or power output of these generators are limited because the regulators used are not entirely satisfactory. There are three types of regulators used with aviation generators. The Tirrill type regulator is limited to field currents of 1.5 amperes, and at high altitudes the 28-volt drop across the contacts of the regulator is sufficient to cause severe flashovers. In addition, the rapid fluctuations of the field result in voltage variations which cause radio interference. The second type of regulator used is the step type in which a number of resistances are introduced in series with the field of the generator to control the voltage. A great number of steps is required to hold the voltage within the required limitations over the entire range of speed and load. These resistances, which are placed in series with the generator field, must carry field current and therefore must dissipate very high wattages. As a result of the great number of steps, such a regulator is slow to operate and does not react to sudden changes in speed and load. The third type of regulator which has been used for aviation equipment is the carbon pile regulator. This regulator operates satisfactorily on field current of 10 amperes or less, but, as in the case of the step type regulator, it introduces resistances in series with the field of the generator and must dissipate the high wattage developed. The regulator is thus limited by the amount of wattage the carbon pile can dissipate, and the field currents of the generator are limited by the minimum resistance of such a carbon pile. On present regulators this is in the neighborhood of .4 ohm, so that on a 10 ampere field the regulator must dissipate 40 watts. As the resistance increases this wattage will increase to about 60 watts and then start to decrease as the field current is cut down.

In my copending patent application S. N. 399,135, filed June 21, 1941, a generator regulator is disclosed that is an improvement upon those now in use. In that regulator the back electromotive force produced by an electric motor is used to repress the current in the field of the generator. A friction brake prevents the motor from running until the generator is producing the desired voltage, and the brake is controlled by electromagnetic means connected to the armature circuit of the generator. Although such a regulator has its advantages it is not entirely suitable for generators with a high rating because a relatively great wattage would have to be dissipated in the regulating device and that would produce too much heat.

It is among the objects of this invention to provide a generator regulator which can be designed to handle any amount of field current required, which is practically instantaneous in its reaction to changes in conditions at the generator being regulated, which has no more radio interference than that generator, in which the wattage dissipated in regulating the generator field is reduced to a minimum, in which that wattage is not dependant upon the field current of the generator being regulated, in which the wattage that must be dissipated decreases as the regulator begins to operate, in which the regulating contacts are operated at sufficiently low voltage and current to permit satisfactory operation at any altitude, and in which the regulation is effected by varying the field of an auxiliary generator. Another object is to provide such a regulator in which the auxiliary generator may be driven electrically at any desired speed by and relative to the main generator without the use of resistance in the main generator circuit.

In accordance with this invention a small auxiliary generator preferably is electrically driven by the main generator. The field circuit of the auxiliary generator is connected to the armature circuit of the main generator, and the armature circuit of the auxiliary generator is connected in series with the field circuit of the main generator. As a result, the electromotive force produced by the auxiliary generator is fed back upon the current in the generator field circuit and represses or curbs that current so that the output of the main generator is restricted. To give control over the output of the main generator, means is provided, controlled by the main generator output, for controlling the field circuit of the auxiliary generator whereby that field is intermittently energized and deenergized. When the field is deenergized, as it is normally, the auxiliary generator does not produce any electromotive force, but when the output of the main generator reaches a predetermined value the auxiliary field becomes energized whereupon the auxiliary generator produces an electromotive force. The result is that the output starts to drop, so the field of the auxiliary generator is again deenergized and no more back electromotive force is produced until the output of the main generator starts to rise again. Coils may be added to the regulator to cut down the back electromotive force when the load on the main generator is high, to increase the frequency at which the regulating contacts operate, to help decrease hysteresis and other effects varying with the field current, and to decrease the auxiliary generator voltage in case it tries to go too high.

The invention is illustrated in the accompanying drawing in which Fig. 1 is a diagrammatic view of one embodiment; and Figs. 2, 3, 4, and 5 are similar views of four different modifications of the invention.

Referring to Fig. 1 of the drawing, a shunt wound generator 1 has current leads 2 and 3 extending away from it with lead 2 connected directly to its field coil 4. The other end of the field coil is connected to lead 3 indirectly through a small auxiliary generator 6 by which the output of the main generator is regulated. More specifically, the field coil is connected by a wire 7 to one of the brushes of the auxiliary generator, and the other brush is connected by wire 8 to lead 3 of the main generator. The field coil 10 of the auxiliary generator is electrically connected across leads 2 and 3 with a resistance element 11 in series with the coil and one of the leads. The auxiliary generator may be driven continuously at a uniform speed by any suitable means, but it preferably is driven electrically by the main generator by means of current by-passed around coil 4 through a resistor 12 connected across wires 2 and 7. A resistor is chosen that will by-pass enough current to keep the auxiliary generator running fast enough to regulate the main generator without the use of resistances in the main generator circuit. When the auxiliary generator is operating with its field coil energized it produces an electromotive force that is fed back through wires 7 and 8 into the field coil 4 of the main generator where it represses the current in that circuit and thereby restricts the output of the main generator.

In order to permit the main generator to generate any desired current or voltage before a further rise is prevented, the auxiliary generator is controlled in such a way that it does not start to produce an electromotive force until the main generator output reaches the desired value. The preferred way of doing this, as illustrated in Fig. 1, is by connecting a pair of electric contacts 13 and 14 in parallel with field coil 10 for shunting the current around the coil when the contacts are closed. When field coil 10 is thus deenergized the auxiliary generator runs idly without generating any electromotive force, and therefore at such times it has no effect on the main generator. The contacts 13 and 14 normally are closed with one of them, the upper one shown in the drawing, adapted to be moved away from the other contact. The movable contact normally is held against the stationary one by any suitable means, such as a spring (not shown), but to regulate the main generator the contacts are separated every time the main generator output attempts to exceed a predetermined value by a solenoid 15. In case it is desired to regulate the voltage of the main generator the solenoid is connected across the main generator between the leads 2 and 3. When that voltage reaches a predetermined value for which the regulator has been set it energizes the solenoid sufficiently to draw upper contact 13 away from the lower one.

The T-shaped member 16 connected to the top of contact 13 represents diagrammatically the armature that is attracted by the solenoid for lifting the contact. As the form of this armature and the way it is associated with the solenoid and reciprocable contact do not form a part of this invention a more detailed illustration is deemed unnecessary, especially since reference may be made to my copending patent application S. N. 378,331, filed February 11, 1941, for a suitable assembly of solenoid, armature, spring, and reciprocable contact.

In operation, as long as the voltage of the main generator remains below the value for which the regulator has been set, no restraining electromotive force is generated by the rotating armature of the auxiliary generator 6 because contacts 13 and 14 remain closed so that the current flows through them around the field coil 10. When the particular maximum voltage desired is reached the solenoid 15 draws armature 16 toward it and thereby separates the regulating contacts. Current must then flow through field coil 10, whereupon the auxiliary generator starts to produce electromotive force that feeds back into the field circuit of the main generator. This represses the current in field coil 4 so that the voltage of the main generator starts to drop. This slight drop in voltage is sufficient to cause the solenoid to release contact 13 which immediately moves back into engagement with contact 14 to deenergize field coil 10. Production of electromotive force by the auxiliary generator therefore stops, so the voltage of the main generator starts to rise again, thus causing solenoid 15 to again lift contact 13. This cycle is repeated many times per second and as the rise and fall of voltage is very small, the voltage of the main generator is held substantially constant.

Resistor 11 protects the generator from the danger of a dead short when the regulating contacts are closed. It also eliminates arcing across those contacts by holding the voltage and current down to low values.

A very important advantage of this apparatus is that there is no making and breaking of the field circuit of the main generator, but the current therein is held steady at the necessary value by the auxiliary generator. With a steady field current the voltage of the main generator remains substantially steady and does not fluctuate rapidly between zero and a high value as it does when the field circuit of the main generator is alternately opened and closed. Consequently, voltage variations of the main generator which would cause radio interference are eliminated. There is no similar problem with the auxiliary generator, even though its field current is periodically interrupted, because the auxiliary generator does not produce any voltage in leads 2 and 3.

The regulator does not have to dissipate any wattage external to the auxiliary generator, and the armature of the latter can be made so low in resistance that the wattage dissipated therein is kept at a minimum. By proper design of the armature of the auxiliary generator there is no practical limit to the amount of field range of the main generator which can be handled. As the back electromotive force opposes the field current of the main generator and cuts it down by reducing the voltage across the field rather than by introducing resistance in series with the field, the wattage that must be dissipated actually decreases instead of increases as the regulation begins to take place.

Since the regulating contacts respond very quickly to any change in the voltage of the main generator, even with highly inductive field, the only lag is that time and the time lag in the fields of the main and auxiliary generators. The regulating contacts are operated at a sufficiently low voltage and current to permit said operation at any altitude.

This apparatus eliminates the brake disclosed in my above-mentioned copending application S. N. 399,135 and the heat resulting therefrom. It also eliminates the disadvantage due to the possibility of wear affecting the operating of that brake. Likewise, the auxiliary generator can be made lighter in weight than the motor shown in that application. It therefore is cheaper.

Figure 2:
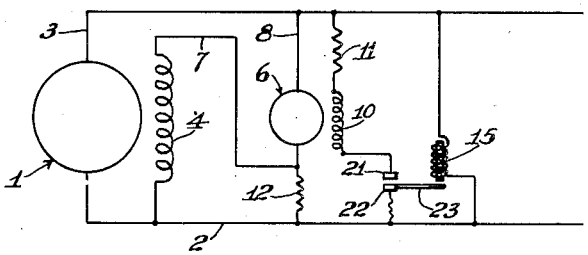

The apparatus shown in Fig. 2 of the drawing is the same as that shown in Fig. 1 except that the regulating contacts 21 and 22 are not connected in parallel with the field coil 10 of the auxiliary generator, but in series with the coil between it and lead 2 from the main generator. As a result, the contacts normally must be separated or open as shown so that no current will flow through coil 10 until the voltage of the main generator rises to the value for which the regulator has been set. Accordingly, with this arrangement the solenoid 15 operates to close the regulating contacts, rather than to open them, to permit current to flow through field coil 10. The manner in which the solenoid closes the contacts is illustrated diagrammatically by the member 23 that projects from the side of the reciprocable contact 22. This member represents the armature that is attracted by the solenoid for lifting contact 22 into engagement with stationary contact 21 above it. An advantage of this embodiment of the invention is that the auxiliary generator field can be wound for high voltage whereby less copper is used and the generator is lighter in weight. A disadvantage is that the regulator is more difficult to control because the contacts close with a rise in voltage and open with a drop in voltage. This leads to "hunting" unless the relay is extremely sensitive.

Figure 3:
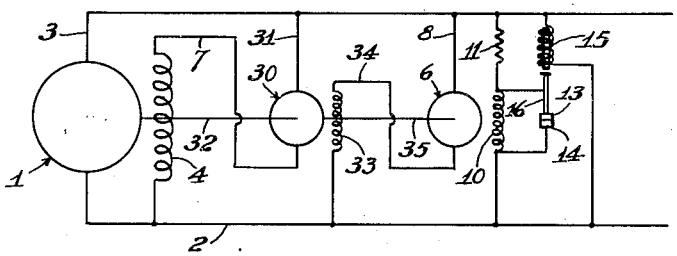

In the case of a large generator whose field current is so high that the auxiliary generator field current necessary to control it would be too great for the regulating contacts to handle satisfactorily, the setup shown in Fig. 3 may be used. In this embodiment the field of the main generator is controlled by a small auxiliary generator 30 connected to wire 7, and to lead 2 by a wire 31. This generator may be driven in the same way as in the preceding embodiment, or through a shaft from the main generator as indicated by the line 12 connecting the two generators. As the power required to reduce the voltage across the main generator field is received through a drive shaft from the main generator it thus becomes only a minor part of the load on the driving motor of the main generator. The field coil 33 of auxiliary generator 30 is not cut in and out of the circuit by regulating contacts, so it can carry a higher current than a field so regulated. Instead, field coil 33 is regulated like field coil 4, by the electromotive force of an auxiliary generator. Thus, coil 33 is connected by a wire 34 to auxiliary generator 6 whose field need carry only enough current to cause generator 6 to produce sufficient electromotive force for controlling the current in field coil 33. Generator 6 may be driven from generator 30 by a shaft, as represented by line 35. Likewise, if desired, auxiliary generator 6 in Figs. 1 and 2 may be driven by a shaft from the main generator instead of electrically, but electrical operation is preferred because it is simple, less expensive, and permits the auxiliary generator to be mounted anywhere because it does not need to be mechanically connected to the main generator or to a separate driving motor.

Figure 4:
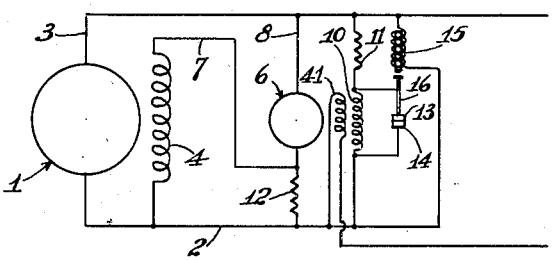

In the modification shown in Fig. 4 the main circuit is the same as that shown in Fig. 1, but a coil 41 is wound on the field 10 of the auxiliary generator and is connected in series with lead 2 of the main generator. The purpose of this coil is to oppose coil 10 as the main generator current increases, due to a heavy load on the generator, so that the regulating contacts 13 and 14 will not have to carry a correspondingly increased current. The advantages are that the contacts last longer, and a simpler design of auxiliary generator is permitted.

Figure 5:
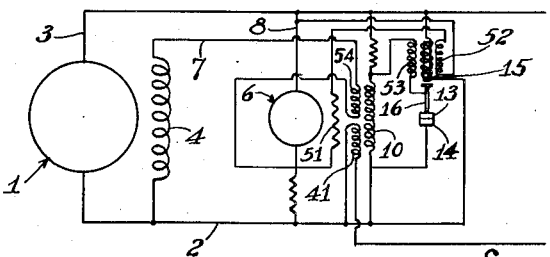

The embodiment of the invention shown in Fig. 5 likewise makes use of a coil 41 for opposing the current in field coil 10 when the load on the main generator is high. A resistor 51 is connected across the armature of the auxiliary generator 6 to help keep the back electromotive force from fluctuating too much. A coil 52, connected in series or in parallel with resistor 51, is wound on solenoid 15 in order to help prevent hysteresis or other effects varying with the field current. Another coil 53 also is wound on the solenoid and is connected either in series or in parallel with the regulating contacts, the purpose being to increase the frequency of operation of the reciprocating contact 13. Connected in wire 7 in series or in parallel with field coil 4 is a further coil 54 wound on the field 10 of the auxiliary generator. In case the voltage of the auxiliary generator starts to become too high this coil will oppose the current in field coil 10 and keep that voltage from rising higher.

Any of the above-discussed embodiments of the invention may be used for regulating the current output of a generator rather than its voltage output by merely connecting regulating solenoid 15 in series in one of the main generator leads instead of across those leads. Also, such a current regulator and voltage regulator can be used in combination so that both current and voltage of a generator are regulated, as disclosed in my above-mentioned copending patent applications.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. The combination with a main generator, of an auxiliary generator having its field coil connected to the armature circuit of the main generator and having its armature in series with the field circuit of the main generator, means for driving the auxiliary generator to produce an electromotive force that represses the current in the field circuit of the main generator, a set of electric contacts connected to the field circuit of the auxiliary generator and adapted to be opened and closed for periodically deenergizing said field coil, a solenoid coil connected to the armature circuit of the main generator, means operatively connecting the solenoid to one of said contacts for opening and closing them in accordance with the output of the main generator whereby said electromotive force is controlled and regulates the output of the main generator, and a coil connected across the armature of the auxiliary generator and associated with said solenoid.

2. The combination with a main generator, of an auxiliary generator having its field connected to the armature circuit of the main generator and having its armature in series with the field circuit of the main generator, a resistor in parallel with the field circuit of the main generator for by-passing current to the auxiliary generator for driving it to produce an electromotive force that represses the current in the field circuit of the main generator, and means for controlling the field of the auxiliary generator whereby said electromotive force is controlled and regulates the output of the main generator.

3. The combination with a main generator requiring high field current, of an auxiliary generator having its field coil connected to the armature circuit of the main generator and having its armature in series with the field circuit of the main generator, a resistor in parallel with the field circuit of the main generator for by-passing current to the auxiliary generator for driving the auxiliary generator to produce an electromotive force that represses the current in the field circuit of the main generator, a set of electric contacts connected to the field circuit of the auxiliary generator and adapted to be opened and closed for periodically deenergizing said field coil, a solenoid coil connected to the armature circuit of the main generator, means operatively connecting the solenoid to one of said contacts for opening and closing them in accordance with the output of the main generator whereby said electromotive force is controlled and regulates the output of the main generator, and a coil connected across the armature of the auxiliary generator and associated with said solenoid.

4. The combination with a main generator requiring high field current, of an auxiliary generator having its field coil connected to the armature circuit of the main generator and having its armature in series with the field circuit of the main generator, a resistor in parallel with the field circuit of the main generator for by-passing current to the auxiliary generator for driving the auxiliary generator to produce an electromotive force that represses the current in the field circuit of the main generator, a set of electric contacts connected to the field circuit of the auxiliary generator and adapted to be opened and closed for periodically deenergizing said field coil, a solenoid coil connected to the armature circuit of the main generator, means operatively connecting the solenoid to one of said contacts for opening and closing them in accordance with the output of the main generator whereby said electromotive force is controlled and regulates the output of the main generator, a coil connected across the armature of the auxiliary generator and associated with said solenoid to minimize hysteresis, and a coil connected across the field coil of the auxiliary generator and associated with said solenoid to increase the frequency of operation of said contacts.

5. The combination with a main generator requiring high field current, of an auxiliary generator having its field coil connected to the armature circuit of the main generator and having its armature in series with the field circuit of the main generator, a resistor in parallel with the field circuit of the main generator for by-passing current to the auxiliary generator for driving the auxiliary generator to produce an electromotive force that represses the current in the field circuit of the main generator, a set of electric contacts connected to the field circuit of the auxiliary generator and adapted to be opened and closed for periodically deenergizing said field coil, a coil core mounted adjacent one of said contacts, three coaxial electric coils wound around one another on said core, means connecting one of said coils to the armature circuit of the main generator to form a solenoid coil that opens said contacts in accordance with the output of the main generator whereby said electromotive force is controlled and regulates the output of the main generator, means for connecting another of said coils across the armature of the auxiliary generator to decrease hysteresis, and means for connecting the remaining coil across the field coil of the auxiliary generator to increase the frequency of operation of said contacts.

ERLE I. SHOBERT, II.